Nov. 26, 1957  J. G. COVITT ET AL  2,814,084
CENTRIFUGAL MOLD FOR MAKING TORQUE CONVERTER CASTINGS
Filed Aug. 27, 1954

INVENTORS
JACK G. COVITT
GERALD F. PUTNAM
BY Paul O. Pippel
ATTY.

United States Patent Office 2,814,084
Patented Nov. 26, 1957

2,814,084

CENTRIFUGAL MOLD FOR MAKING TORQUE CONVERTER CASTINGS

Jack G. Covitt and Gerald F. Putnam, Fort Wayne, Ind., assignors to International Harvester Company, a corporation of New Jersey Application August 27, 1954, Serial No. 452,605

12 Claims. (Cl. 22—113.5)

This invention relates to an improved mold for making castings. More specifically, the invention relates to an improved core and mold for manufacturing torque converter castings by centrifugal means.

Torque converter castings are generally manufactured by centrifugal casting processes. In this type of manufacture, it is exceedingly important that the core segments of the mold be accurately manufactured, and extreme care must be taken in placing the segments in proper relation within the mold. The segments are generally made of a plaster-like material wherein very close tolerances must be held. Such core segments are usually first placed on an assembly plate or table whereon they are accurately positioned relative to each other. In this position, they must be interconnected so that they can be transferred to the mold as an assembled core, which is then carefully connected to the mold so that the relative position of the cores is maintained. It is a prime object of this invention, therefore, to provide an improved means for interconnecting the core segments of a torque converter core, and to provide an improved means for positioning said core within a centrifugal mold.

Still another object is to provide a plurality of frangible or ceramic core segments securely interconnected by means of a frangible connecting member which is placed in position after the core segments have been properly set in place relative to each other.

A still further object is to provide an improved means for connecting the core segments of a torque converter core in assembly, and including improved means by which the assembled core may be transported to a centrifugal mold.

A still further object is to provide an improved connecting means for positioning a torque converter core in a centrifugal mold so that the core segments of the core may be maintained in accurate position during the casting process.

These and further objects will become more readily apparent from a reading of the specification when examined in connection with the accompanying sheet of drawing.

Figure 1:
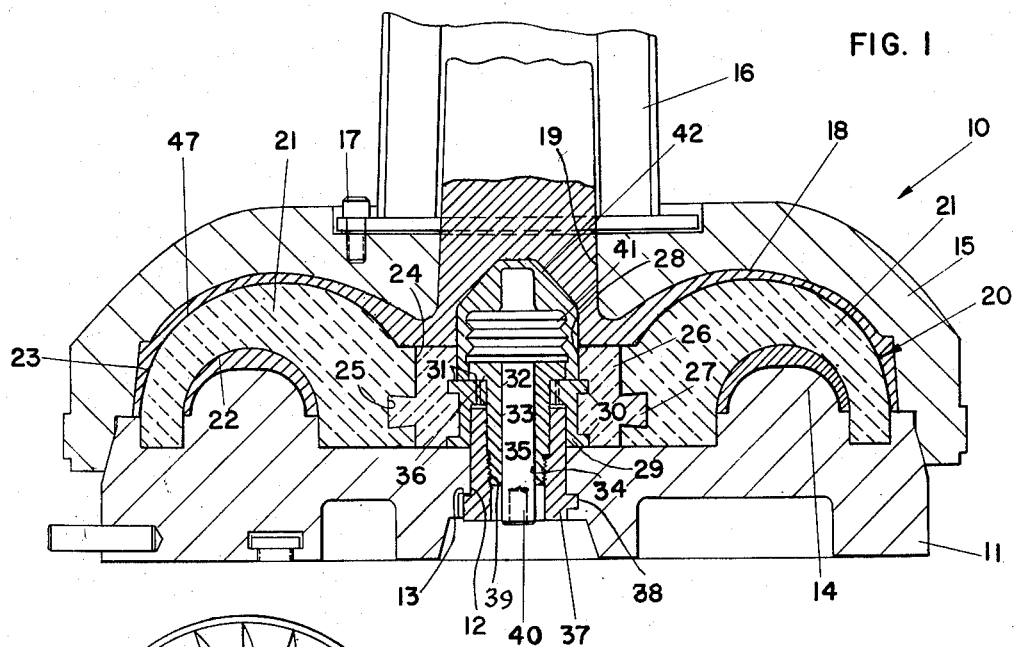
Figure 1 is a cross section through an elevation of a centrifugal mold for making torque converter castings.

Referring now particularly to Figure 1, a centrifugal mold is generally designated by the reference character 10. The mold 10 comprises a lower mold member 11 having a central bore 12. The mold member 11 is provided with an undercut portion adjacent the bore 12 to provide a shoulder 13. The lower mold member 11 is also provided with an annular projection 14. An upper mold member is designated at 15. The upper mold member 15 includes an inlet gate 16 which is connected to the upper mold member 15, as indicated at 17. The lower and upper mold members 11 and 15 respectively may be suitably positioned on a centrifugal casting machine (not shown), the said members being connected together to provide a casting or cast metal receiving chamber 18. The chamber 18 is in communication with the inlet gate 16 by means of an inlet opening 19 provided in the upper mold member 15.

As indicated in Figure 1, a core is generally designated by the reference character 20. The core consists of a plurality of circumferentially disposed core segments 21, the segments being shown in assembled position in Figure 3. The core segments 21 are usually made of a plaster-like material having high resistance against shrinkage and expansion. These segments must be carefully made so that the dimensional tolerances are well controlled in order to assure an acceptable cast product. Each of the segments 21 includes an arcuate bottom wall generally conforming in shape to the annular projection 14. The segments 21 also each include an outer wall 23 and an inner wall 24.

Figure 2:
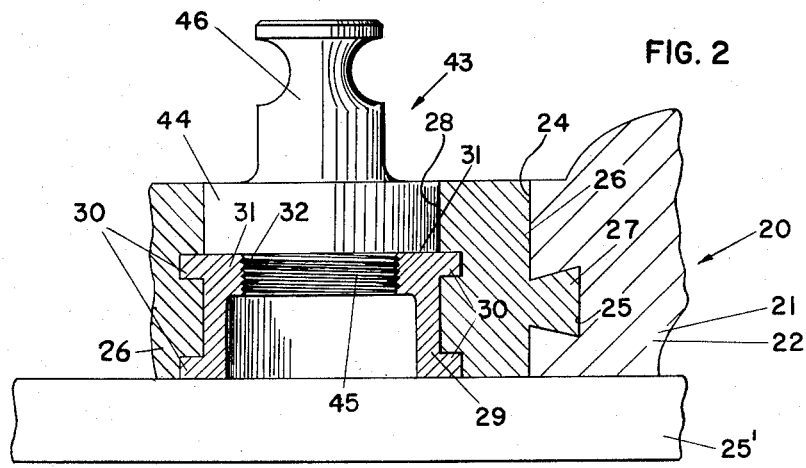
Figure 2 is an enlarged fragmentary view of a device for connecting together the segments of a torque converter core including means for permitting the transportation of the connected core to a centrifugal mold.
Figure 3:
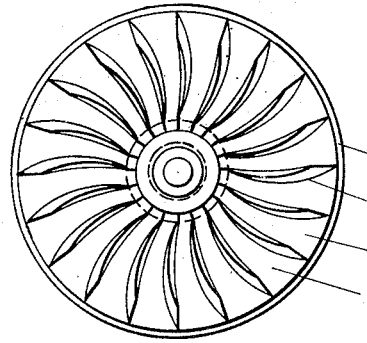
Figure 3 is a plan view of a torque converter core including a plurality of core segments connected together in an assembled position for delivery to a centrifugal mold.

As best shown in Figure 2 each segment 20 has a dove-tail recess 25 disposed in the inner wall 24. A frangible or ceramic-like connecting member 26 is shown centrally positioned with respect to the core segments 21. In the assembly of the core segments 21 they are first placed on an accurately machined assembly table 25' as best shown in Figures 2 and 3. After the segments 20 have been firmly positioned on this table, against relative movement, a plaster is poured into the opening formed by the inner walls of the cores 24. This plaster after it has set forms the frangible connecting member 26. The frangible connecting member 26 includes a dove-tail 27 engaging the dove-tail recesses 25 to firmly connect the core segments 21 in assembly. Simultaneously with the pouring of the connecting member 26 provisions are made to provide an axially extending bore 28 in which a sleeve 29 is positioned. The sleeve 29 is generally made of a suitable durable material, such as steel, etc. Flanges 30 of the sleeve 29 are disposed within the connecting member 26 to rigidly secure the said sleeve 29 on said member.

As best shown in Figures 1 and 2 the sleeve 29 also includes a shoulder 31 having a threaded opening 32. A first telescoping member, or male flanged sleeve 33, is positioned on the sleeve 29 as shown in Figure 1. The sleeve 33 includes a bore 34 and also an externally threaded portion 35. A flange 36 on the sleeve 33 is seated on the shoulder 31. The male sleeve 33 extends downwardly into the bore 12 of the lower mold member 11. A second telescoping member, or female flanged sleeve 37, engages the sleeve 33 in relative mating or telescoping relation. The sleeve 37 also includes a flange 38 which is adapted to engage the shoulder 13 of the member 11. The sleeve 37 is also threaded as indicated at 39 for engaging the external threads 35 of the sleeve 33. It is now apparent that by rotating the sleeves 33 and 37 relative to each other the threads 35 and 39 are effective to draw the sleeves 33 and 37 toward each other whereupon the downward pressure on the sleeve 29 is effective to tightly secure the complete core assembly on the lower mold member 11.

A knock-out pin 40 is shown disposed in the bore 34 of the sleeve 33. The knock-out pin 40 is provided at its upper end with a serrated enlargement 41 to which a serrated head 42 is connected. The head 42 is also formed of a plaster material and has a lower portion engaging the connecting member 26 to prevent the entrance of cast material into the bore 28 of the connecting member.

As indicated above, the core segments 21 are placed on the table 25' in proper position. The table 25' may be provided with suitable guide members, not shown, arranged to accurately position the core segments 21 in spaced circumferential relation. Likewise the sleeve 29 which is usually made of metal, is placed in the position centrally located between the inner walls 24 of the cores. A handle member 43, having a cylindrical portion 44 and a threaded portion 45, is then connected to the sleeve 29. Next a plaster-like material is poured into the annular space formed by the inner peripheral walls 24 and the outer portions of the handle member 43 and the sleeve 29. After this plaster-like material has dried the connecting member 26 is thus formed, the said member being provided with the dove-tail 27 which fits into the recesses 25 of the core sections. It can be seen that the core sections are now all firmly connected together and accurate positioning is maintained. The core sections are now all lifted in assembly by an operator who grips a gripping member 46 on the handle 43, and lifts the complete unit onto the lower mold member 11 where it is positioned as indicated in Figure 1. The handle member 43 is now unscrewed from the sleeve 29, and the first telescoping male member is placed into the position indicated. The female telescoping member 37 is then fastened onto the male telescoping member 33 in the manner indicated and tightening of said members 33 and 37 effectively secures the complete core assembly to the bottom sleeve 11. The knock-out pin 40 is now inserted in position and it can be seen that the head 42 of this pin is arranged to completely close the upper end of the bore 28 so that casting material which poured through the inlet gate 16 is diverted to the chamber 18 and the casting 47 is thus formed. After the casting has been formed the upper mold member 15 is removed and a suitable knock-out fixture (not shown) is adapted to engage the knock-out pin 40 whereupon the casting 47 is removed from the lower mold 11.

It can now be seen that an improved and novel centrifugal mold has been described. The cores for the mold may be accurately positioned and in this position may be expeditiously moved into the position on the mold without danger of misalignment. Likewise when in position the core is firmly fastened to the mold so that accuracy in the final product is assured. Thus it can be seen that the objects of the invention have been achieved and it must be understood that changes and modifications may be made without departing from the spirit of the invention as disclosed or the scope thereof as defined in the appended claims.

What is claimed is:

1. A centrifugal mold comprising upper and lower mold members connected to provide a casting chamber, said upper mold member having an inlet passage in communication with said chamber, a plurality of core elements circumferentially disposed within said chamber on such lower mold member, said lower mold member having a centrally disposed axially extending first bore, a frangible connecting member centrally positioned and interconnecting said cores, said frangible member having a second bore in axial alignment with said first bore, a sleeve disposed in said second bore, said sleeve having an opening in axial alignment with said bores, a shoulder on said sleeve projecting inwardly with respect to said second bore and said opening, said shoulder having a threaded bore, means connecting said cores and said frangible connecting member to said mold comprising a male sleeve having a flange at one end adapted to seat upon said shoulder, said male sleeve having an externally threaded reduced portion at its other end, a female sleeve having a flange at one end adapted to engage said lower mold member, said female sleeve engaging said male sleeve in telescoping relation and having an internally threaded portion engaging said threaded reduced portion whereby said male and female sleeves may be drawn toward one another, a knock-out pin slidably disposed within said male sleeve, an enlarged portion on said knock-out pin above said male sleeve, and a frangible head on said enlarged portion, said head having an outer portion in engagement with the second bore.

2. A centrifugal mold comprising upper and lower mold members connected to provide a casting chamber, said upper mold member having an inlet passage in communication with said chamber, a plurality of core elements circumferentially disposed within said chamber on said lower mold member, said lower mold member having a centrally disposed axially extending first bore, a connecting member centrally positioned and interconnecting said cores, said connecting member having a second bore in axial alignment with said first bore, a sleeve disposed in said second bore, a shoulder on said sleeve projecting inwardly with respect to said second bore, said shoulder having a threaded bore, means connecting said cores and said connecting member to said mold comprising a male sleeve having a flange at one end adapted to seat upon said shoulder, said male sleeve having an externally threaded reduced portion at its other end, a female sleeve having a flange at one end adapted to engage said lower mold member, said female sleeve engaging said male sleeve in telescoping relation and having an internally threaded portion engaging said threaded reduced portion whereby said male and female sleeves may be drawn toward one another, a knock-out pin slidably disposed within said male sleeve, an enlarged portion on said knock-out pin above said male sleeve, and a frangible head on said enlarged portion.

3. A centrifugal mold comprising upper and lower mold members connected to provide a casting chamber, said upper mold member having an inlet passage in communication with said chamber, a plurality of core elements circumferentially disposed within said chamber on said lower mold member, said lower mold member having a centrally disposed axially extending first bore, a connecting member centrally positioned and interconnecting said cores, said connecting member having a second bore in axial alignment with said first bore, a sleeve disposed in said second bore, a shoulder on said sleeve projecting inwardly with respect to said second bore, said shoulder having a threaded bore, means connecting said cores and said connecting member to said mold comprising a male sleeve having a flange at one end adapted to seat upon said shoulder, said male sleeve having an externally threaded reduced portion at its other end, a female sleeve having a flange at one end adapted to engage said lower mold member, said female sleeve engaging said male sleeve in telescoping relation and having an internally threaded portion engaging said threaded reduced portion whereby said male and female sleeves may be drawn toward one another, a knock-out pin slidably disposed within said male sleeve, and a frangible head on said pin.

4. A centrifugal mold comprising upper and lower mold members connected to provide a casting chamber, said upper mold member having an inlet passage in communication with said chamber, a plurality of core elements circumferentially disposed within said chamber on said lower mold member, said lower mold member having a centrally disposed axially extending first bore, a connecting member centrally positioned and interconnecting said cores, said connecting member having a second bore in axial alignment with said first bore, a sleeve disposed in said second bore, a shoulder on said sleeve, said shoulder having a threaded bore, means connecting said cores and said connecting member to said mold comprising a male sleeve having a flange at one end adapted to seat upon said shoulder, said male sleeve having an externally threaded reduced portion at its other end, a female sleeve having a flange at one end adapted to engage said lower mold member, said female sleeve engaging said male sleeve in telescoping relation and having an internally threaded portion engaging said threaded reduced portion whereby said male and female sleeves may be drawn toward one another, and a knock-out pin slidably disposed within said male sleeve.

5. A mold comprising upper and lower mold members connected to provide a casting chamber, said upper mold member having an inlet passage in communication with said chamber, a plurality of core elements circumferentially disposed within said chamber, said lower mold member having a centrally disposed axially extending first bore, a connecting member having a second bore in axial alignment with said first bore, a first sleeve disposed in said second bore, means connecting said cores and said connecting member to said mold comprising a male sleeve having a flange at one end adapted to seat upon said first sleeve, said male sleeve having first connecting means, a female sleeve having a flange at one end adapted to engage said lower mold member, said female sleeve engaging said male sleeve in telescoping relation and having a second connecting means engaging said first connecting means whereby said male and female sleeves may be drawn toward one another, and a knock-out pin slidably disposed within said male sleeve.

6. A mold comprising upper and lower mold members connected to provide a casting chamber, an inlet passage on one of said members in communication with said chamber, a plurality of core elements circumferentially disposed within said chamber, said lower mold member having a centrally disposed axially extending first bore, a connecting member axially positioned and connecting said cores, said connecting member having a second bore in axial alignment with said first bore, a first sleeve disclosed within said second bore means connecting said cores and said connecting member to said mold comprising a male sleeve having means engaging said first sleeve, said male sleeve having first connecting means, a female sleeve engaging said lower mold member, said female sleeve engaging said male sleeve in telescoping relation, and second connecting means on said female sleeve engaging said first connecting means to draw said male and female sleeves together.

7. A mold comprising upper and lower mold members connected to provide a casting chamber, a plurality of core elements circumferentially disposed within said chamber, a connecting sleeve connecting said cores, means connecting said cores and connecting sleeve to said mold, comprising first and second telescoping members having movable interengaging fastening means for axially moving said members relative to each other, first connecting means on said first telescoping member engaging said connecting sleeve, and second connecting means on said second telescoping member engaging said lower mold member, whereby said fastening means is movable for moving said telescoping members toward each other to maintain said core elements against movement with respect to said mold.

8. A core for a centrifugal mold comprising a plurality of core segments circumferentially disposed in circumferentially spaced relation, each of said cores having inner and outer wall portions, a dove-tail recess on each inner wall, a connecting member having an outer peripheral wall and an axially extending bore, a dove-tail projection projecting outwardly from said peripheral wall and engaging the dove-tail recesses of said cores in interconnecting relation, a sleeve disposed within the bore of said connecting member and connected thereto, said sleeve having an internally threaded bore, a handle member, said handle member having a cylindrical body engaging a portion of said axially extending bore, a reduced threaded portion on said body engaging said threaded bore, and gripping means on said body.

9. A core for a centrifugal mold comprising a plurality of core segments having circumferentially disposed inner and outer wall portions, a dove-tail recess on each inner wall, a connecting member having an outer peripheral wall and an axially extending bore, a dove-tail projection projecting outwardly from said peripheral wall and engaging the dove-tail recesses of said cores in interconnecting relation, a sleeve disposed within the bore of said connecting member and connected thereto, said sleeve having an internally threaded bore, a handle member, said handle member having a cylindrical body engaging said connecting member, said reduced threaded portion on said body engaging said threaded bore, and gripping means on said body projecting upwardly with respect thereto.

10. A core for a centrifugal mold comprising a plurality of core segments circumferentially disposed in circumferentially spaced relation, each of said cores having inner and outer wall portions, a dove-tail recess on each inner wall, a connecting member having an outer peripheral wall and an axially extending bore, a dove-tail projection projecting outwardly from said peripheral wall and engaging the dove-tail recesses of said cores in interconnecting relation, a sleeve disposed within the bore of said connecting member and connected thereto, said sleeve having an internally threaded bore, a handle member, said handle member having a cylindrical body, a threaded portion on said body engaging said threaded bore, and gripping means on said body.

11. A core for a centrifugal mold comprising a plurality of core segments circumferentially disposed, each of said cores having inner and outer wall portions, a recess on each inner wall, a connecting member having an outer peripheral wall and an axially extending bore, a projection projecting outwardly from said peripheral wall and engaging the recesses of said cores in interconnecting relation, a sleeve on said connecting member and connected thereto, said sleeve having an internally threaded bore, a handle member, said handle member having a cylindrical body engaging said connecting member of said axially extending bore, a threaded portion on said body engaging said threaded bore, and gripping means on said body.

12. A core for a centrifugal mold comprising a plurality of core segments circumferentially positioned, each of said core segments having an inner wall, a dove-tail recess in the inner wall of each segment, and a centrally positioned connecting member having a dove-tail projection engaging said recess is for maintaining said segments in connected relation.

References Cited in the file of this patent

UNITED STATES PATENTS

| | | |
|---|---|---|
| 1,674,874 | Puccini et al. | June 26, 1928 |
| 2,135,380 | Benge | Nov. 1, 1938 |
| 2,381,616 | Pfleger | Aug. 7, 1945 |
| 2,440,144 | Hosking | Apr. 20, 1948 |
| 2,536,692 | Miller | Jan. 2, 1951 |
| 2,708,776 | Heintz | May 24, 1955 |

FOREIGN PATENTS

| | | |
|---|---|---|
| 238,039 | Switzerland | Sept. 17, 1945 |